US010948603B2

(12) United States Patent
Rhee

(10) Patent No.: US 10,948,603 B2
(45) Date of Patent: Mar. 16, 2021

(54) REAL-TIME COMMUNICATION BETWEEN SATELLITES AND MOBILE DEVICES

(71) Applicant: DreamSpaceWorld Co., LTD., Daejeon (KR)

(72) Inventor: Sung Ho Rhee, Daejeon (KR)

(73) Assignee: DREAMSPACEWORLD CO., LTD., Daejeon (KR)

( * ) Notice: Subject to any disclaimer, the term of this patent is extended or adjusted under 35 U.S.C. 154(b) by 0 days.

(21) Appl. No.: 16/527,022

(22) Filed: Jul. 31, 2019

(65) Prior Publication Data

US 2021/0011173 A1    Jan. 14, 2021

Related U.S. Application Data

(63) Continuation-in-part of application No. 16/510,814, filed on Jul. 12, 2019.

(51) Int. Cl.

| | |
|---|---|
| *H04W 4/08* | (2009.01) |
| *G01S 19/33* | (2010.01) |
| *H04W 12/06* | (2021.01) |
| *G06K 9/00* | (2006.01) |
| *G01S 19/40* | (2010.01) |
| *H04N 21/00* | (2011.01) |

(52) U.S. Cl.
CPC ............. *G01S 19/33* (2013.01); *G01S 19/40* (2013.01); *G06K 9/0063* (2013.01); *H04W 12/06* (2013.01)

(58) Field of Classification Search
CPC ......... H04B 7/1855; G01C 21/28; H04Q 7/20
USPC ...................... 455/457, 456.1; 701/208, 200
See application file for complete search history.

(56) References Cited

U.S. PATENT DOCUMENTS

| 10,282,562 B1 * | 5/2019 | Speasl ................. H04N 21/835 |
| 2012/0069131 A1 * | 3/2012 | Abelow ............... G06Q 10/067 |
| | | 348/14.01 |

* cited by examiner

*Primary Examiner* — Tu X Nguyen
(74) *Attorney, Agent, or Firm* — Patent Office of Dr. Chung Park

(57) ABSTRACT

Systems and methods for communicating with one or more satellites to acquire information related to a region on a map that is displayed on a mobile device. A mobile device includes: a communication device for directly communicating data with a satellite; a display for displaying a graphic user interface (GUI) that shows an image of a map; one or more processors; and a non-transitory computer-readable medium comprising one or more sequences of instructions which, when executed by the one or more processors, causes steps to be performed comprising: responsive to a touch on the GUI, sending a request signal for information related to a region on the map directly to the satellite via the communication device; receiving the information related to the region on the map directly from a satellite; and displaying the information on the display.

15 Claims, 13 Drawing Sheets

REAL-TIME COMMUNICATION BETWEEN SATELLITES AND MOBILE DEVICES

CROSS REFERENCE TO RELATED APPLICATIONS

This application is a continuation-in-part application of a U.S. patent application Ser. No. 16/510,814, entitled "Real-time Communication Between Satellites and Mobile Devices," filed on Jul. 12, 2019.

TECHNICAL FIELD

The present invention relates to a wireless communication, more particularly, to systems and methods for direct communications between satellites and mobile devices in real-time.

DESCRIPTION OF THE RELATED ART

With advent of satellite technologies, it is now feasible to acquire data using satellites in various technical applications. In the conventional communication systems, the satellites communicate such data with ground stations: the ground stations transmit data to the satellites so as to control/access the satellites and receive data, from the satellites, that was gathered by the satellites during their missions. Thus, if a user of a mobile device wants to access data received from the satellites or control the satellites, the user has to connect to the ground station that can communicate with the satellites.

Such conventional systems have several difficulties. First, when the mobile device is located outside the region, such as desert or remote/secluded area, where the ground station cannot be reached, either wirelessly or by wire, the user cannot communicate with the satellites. Since the ground station has the exclusive direct access to satellites, the communication is possible only through the ground station. Second, the data sent from the satellites is sent to the ground station that subsequently processes the data before sending the processed data to the mobile device. As such, there may be a time delay between transmitting data by the satellites to the receiving the data by the mobile device. Such a time delay may make it impossible for the satellites to communicate with the mobile device in real-time, where the real-time communication may be an important feature in certain emergency situations, such as tsunami warning, typhoon's path prediction, information on volcanic activities, so on. As such, there is a need for systems and methods for direct communication between satellites and mobile devices in real-time.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF PREFERRED EMBODIMENTS

Figure 1:
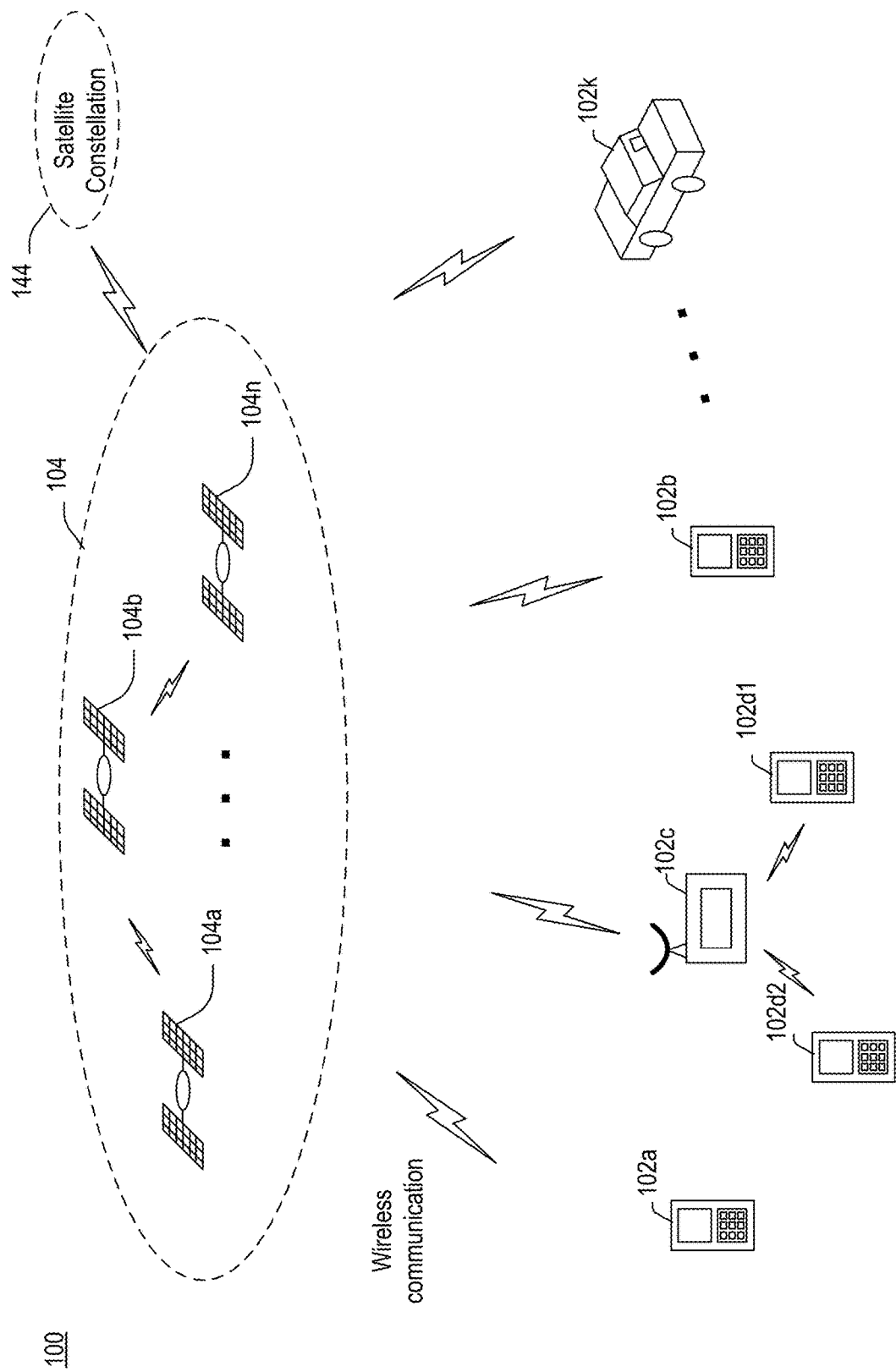
FIG. 1 ("FIG.") shows a schematic diagram of a system for direct communication between satellites and mobile devices according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in the drawings are illustrative of exemplary embodiments of the present invention and are meant to avoid obscuring the invention. Furthermore, connections between components within the figures are not intended to be limited to direct connections. Rather, data between these components may be modified, re-formatted, or otherwise changed by intermediary components or devices. Also, additional or fewer connections may be used. It shall also be noted that the terms "coupled" "connected" or "communicatively coupled" shall be understood to include direct connections, indirect connections through one or more intermediary devices, and wireless connections.

Furthermore, by applying relevant technology, one skilled in the art shall recognize: (1) that certain steps may optionally be performed; (2) that steps may not be limited to the specific order set forth herein; (3) that certain steps may be performed in different orders; and (4) certain steps may be done concurrently.

The present invention relates to a real-time communication between the satellites and mobile devices, more particularly, to systems and methods for direct communication between satellites in orbits and mobile devices in real-time. Hereinafter, the term mobile device(s) may refer to various types of electronic devices that allow the users to directly communicate with a satellite and exchange data with the satellite in real-time, and the electronic devices may include mobile phones, palm computers, Tablet PCs, notebook computers, desktop computers, AR (Augmented Reality) devices, VR (Virtual Reality) devices, smart wearables such as smart goggles, smart glasses and smart watches, remote controlling devices, etc.

FIG. 1 shows a schematic diagram of a system 100 for direct communication between one or more satellites 104a-104n and mobile devices 102a-102k according to embodiments of the present disclosure. As depicted, the satellites 104a-104n may fly in formation and be directly and communicatively coupled to the mobile devices 102a-102k, establishing communication channels between the mobile devices 102a-102k and the satellites 104a-104n.

In embodiments, each of the satellites 104 may include payloads, where each payload may be determined by the mission for outer space, the supporting subsystems and components that make up the bus. In embodiments, the missions may include direct communications with the mobile devices 102a-102k, earth surface observation, weather tracking, maritime measurements and scientific research of celestial bodies, etc.

In embodiments, the missions may also include various scientific research on polar landscapes and icebergs, Earth surface and atmosphere, oceanic circulation, water/energy cycles, and monitoring the concentration of phytoplankton, suspended particulate matter and dissolved organic matter of a given area. In embodiments, payload camera (Optical, SAR(Synthetic Aperture Radar), IR(Infrared), etc.) may be used to analyze surface area landscapes and also directly identify and check in real-time a certain phenomenon taking place in a specific area.

In embodiments, the satellites 104 may include the LEO (Low Earth Orbiting) satellites that orbit relative to the Earth so that they look like they are moving when looked upon from the Earth. In embodiments, the satellites 104 may also include the geosynchronous satellites which orbit the Earth at the same rate as the Earth's rotation (i.e. orbital period equivalent to the Earth's rotation period) so that when looked upon from the Earth, seem like they are staying at the same spots. In embodiments, the satellites 104 may communicate and share data with each other, i.e., perform inter-satellite communication, to form a satellite network.

By way of example, the mobile device 102a (or 102b) may directly communicate date with the satellite 104a (or 104b) in real-time, where the data may include one or more of text message, voice message, image/picture in JPEG format, video clip in MPEG format, telemetry data (described in conjunction with FIGS. 8 and 9), etc. As such, the satellites 104 may enable the two users of the mobile devices 102a and 102b to have phone conversation with each other in real-time. It is noted that, unlike the conventional communications system, any ground station or base station is not needed for the communication between the two mobile devices 102a and 102b in the system 100. (Hereinafter, the term ground station refers to a station that has either fixed or itinerant position on the Earth.) Thus, in embodiments, a phone conversation between the two mobile devices may be possible even if the mobile device (e.g. 102b) may be located in a region, such as desert or remote/secluded area, such that the mobile device 102b cannot reach any ground station or any base station that provides wireless communication services to mobile devices.

In embodiments, each of the satellites 104 may be of various sizes, such as microsat, nanosat and cubesat. Also, the number and locations of satellites 104 may be determined to cover the entire surface area of the Earth, i.e., one mobile device (e.g. 102a) may be able to communicate with other mobile device (e.g. 102k) that is located anywhere on the Earth. By way of example, a signal transmitted from the mobile device 102a may be delivered to another mobile device 102k via the communication channel: mobile device 102a→satellite 104a→satellite 104n→mobile device 102k.

In embodiments, a mobile device (e.g. 102c) may include a mobile relay antenna, where the mobile device 102c may communicate with a satellite (e.g. 104b) and be communicatively coupled to another mobile devices (such as mobile phones) 102d1 and 102d2 either wirelessly or by wire. In FIG. 1, only two mobile devices 102d1 and 102d2 are shown to communicate with the satellite 104b via the mobile device 102c. However, it should be apparent to those of ordinary skill in the art that the mobile device 102c may be used to provide communication services to other suitable number of mobile devices. In embodiments, the mobile devices 102d1 and 102d2 may not be able to transmit the signals directly to the satellites 104 due to the limited output power level. As such, using the mobile relay antenna, the mobile device 102c may transmit a signal at a higher power to thereby transmit the signal further away than the mobile devices 102d1 and 102d2. Similarly, the mobile relay antenna may have a larger footprint, which is an area for receiving the signal from the satellite, than the mobile devices 102d1 and 102d2 to thereby increase the intensity of the signal received from the satellites.

In embodiments, the user of a mobile device (e.g. 102a) may have direct access to the data stored in the satellite and/or may control one or more satellites to perform one or more outer space missions. In embodiments, the mobile device 102a may send data to a satellite (e.g. 104a) so as to control a satellite (e.g. 104b), where the data may include one or more of control parameters, such as (but not limited to) user ID and password, target satellite, satellite identifying information, angle range for coverage area determination, control objective, observation time window, etc. The satellite 104a may validate the user ID in the data from the mobile device 102a and, upon successful authentication of the user ID, the satellite 104a may grant access rights to the mobile device 102a. In embodiments, once access is allocated to the mobile device 102a through the due approval process, the user of the mobile device 102a may start controlling the satellite 104b in real-time within the given angle and time frame allocated during the approval process. In embodiments, the angle refers to the view angle to cover the area of interest.

In embodiments, the authentication process described above may be performed by the satellite 104b instead of the satellite 104a. The satellite 104a may relay the control data received from the mobile device 102a to the satellite 104b by the inter-satellite communication, and the satellite 104b may validate the user ID and send a signal for granting an access right to the mobile device 102a via the satellite 102a. By way of example, the mobile device 102a may control the satellite 104b to acquire an image of tsunami on a specific location on the Earth at a specific point in time.

In embodiments, the satellites 104 may communicate data with other satellite constellation 144, where the satellite constellation may include a number of satellites operating together under shared control and synchronized so as to overlap in coverage. In embodiments, the satellites 104 may access and/or control one or more of the satellites in the satellite constellation 144, i.e., each f the satellites 104 may act as a gateway to the satellite constellation 144.

Figure 2:
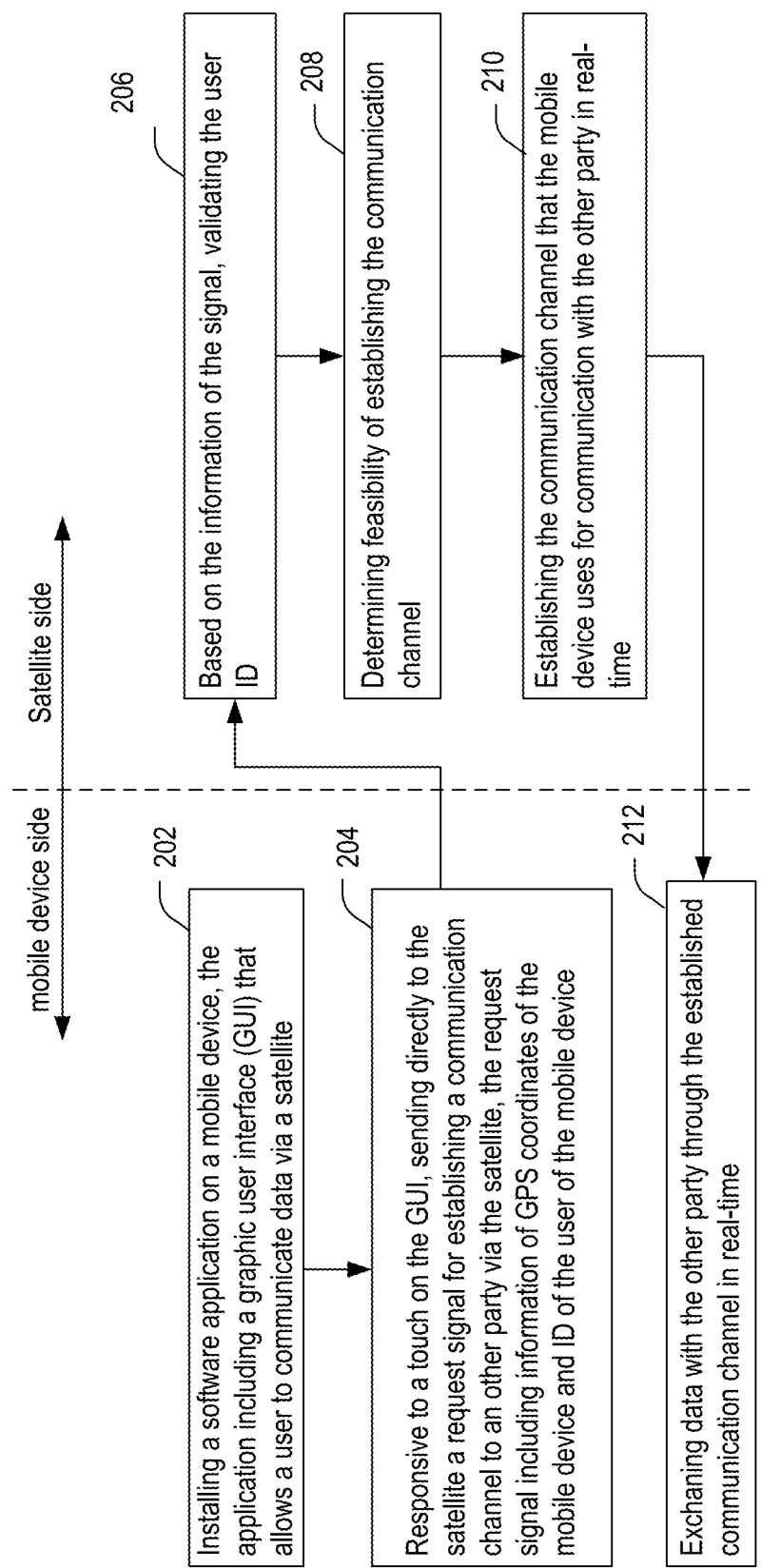
FIG. 2 shows a flowchart of an illustrative process for direct communication between a mobile device and a party on the ground via a satellite in real-time according to embodiments of the present disclosure.
Figure 3:
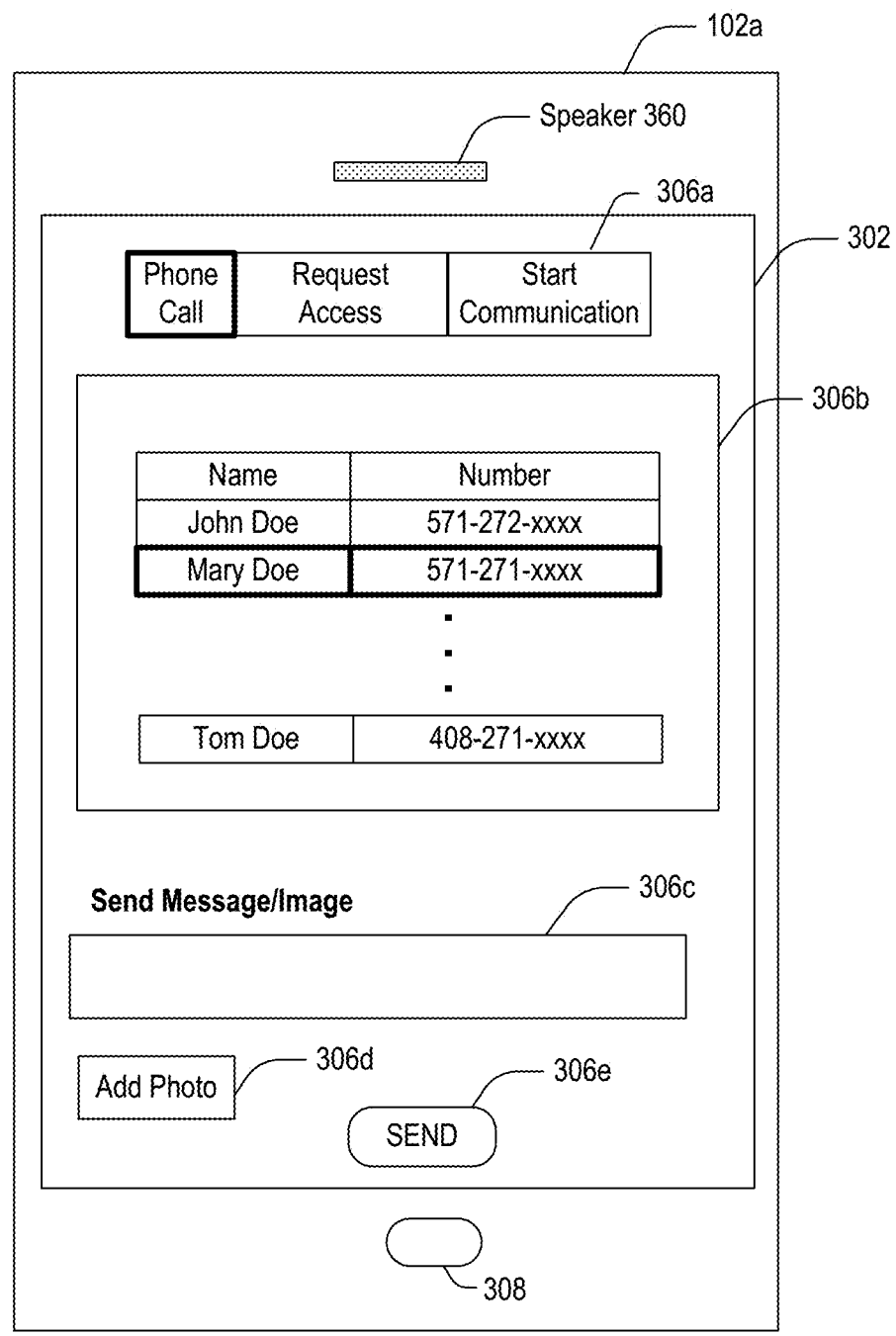
FIG. 3 shows a mobile phone according to embodiments of the present disclosure.

FIG. 2 shows a flowchart of an illustrative process for direct communication between a mobile device and a party on the ground via a satellite in real-time according to embodiments of the present disclosure. The process may start at step 202. At step 202, the user of the mobile device (e.g. 102*a*) may install a software application on the mobile device 102*a*, where the application includes a graphic user interface (GUI) that allows a user to communicate data with a satellite (e.g. 104*a*). FIG. 3 shows the mobile phone 102*a* according to embodiments of the present disclosure. As depicted, the mobile phone 102*a* may include: a speaker 360; a button 308; and a display 302 for displaying the GUI components 306*a*-306*e*. The user of the mobile device 102*a* may push the button 308 to select various functions of the mobile device 102*a*. It is noted that the mobile device 102*a* may have other suitable design and components, such as camera, microphone, etc. Also, the GUI 306 may have other suitable design and arrangements of GUI components.

In embodiments, the user may touch the "Phone Call" button in the menu 306*a* of the GUI. Then, the mobile device 102*a* may display a phone list 306*b* that are already stored in the mobile device, allowing the user select one phone number, such as "Mary Doe," among the phone list. Alternatively, the user may want to send a text message, an image/picture, or a video clip. In such a case, the user may enter a text message into the data field 306*c* and/attach an image/picture in JPEG format or video clip in MPEG format using the button 306*d*. Then, the user may touch the "SEND" button 306*e*.

In response to the user's touch of the "SEND" button, at step 204, the mobile device 102*a* may send, directly to the satellite 104*a*, a request signal for establishing a communication channel to another party. It is noted that the another party may not be necessarily a mobile device, even though the mobile device 102*b* is treated as the other party for the purpose of illustration. In embodiments, as discussed in conjunction with FIG. 8, the request signal may include information of the global positioning system (GPS) coordinates of the mobile device 102*a* and identification (ID) of the user of the mobile device. It is noted that each of the mobile devices 102 may be able to determine the GPS coordinates of its own location. At step 206, the satellite 104*a* may validate the user ID using the signal from the mobile device 102*a*.

Upon successful authentication of the user ID, the satellite 104*a* may assess the feasibility of establishing the communication channel between the mobile devices 102*a* and 102*b* at step 208. In embodiments, the satellite 104*a* may use the information of other satellites' locations to determine the feasibility. For instance, each of the satellites 104 may be able to determine the current location of other satellite, say 104*b*. When the satellite 104*a* receives from the mobile device 102*a* a request to make a phone call to "Mary Doe" and the satellite 104*b* may be currently located to cover the area code "571," the satellite 104*a* may forward the request signal to the satellite 104*b*, querying whether a satellite 104*b* is able to establish the communication channel with the mobile phone 102*b*.

At step 210, the satellite may establish the communication channel that the user of the mobile device 102*a* may use for communication with the user of the mobile device 102*b* in real-time. Then, at step 212, the user of the mobile device 102*a* may chat and/or exchange messages/images/video clips with the user of the mobile device 102*b* via the established communication channel in real-time.

It is noted that the same satellite (e.g. 104*a*) may communicate with both of the mobile devices (e.g. 102*a* and 102*b*) if the two mobile devices are within the range covered by the satellite 104*a*. In such a case, the satellite 104*a* may be able to provide a communication channel between the two mobile devices 102*a* and 102*b*.

Figure 4:
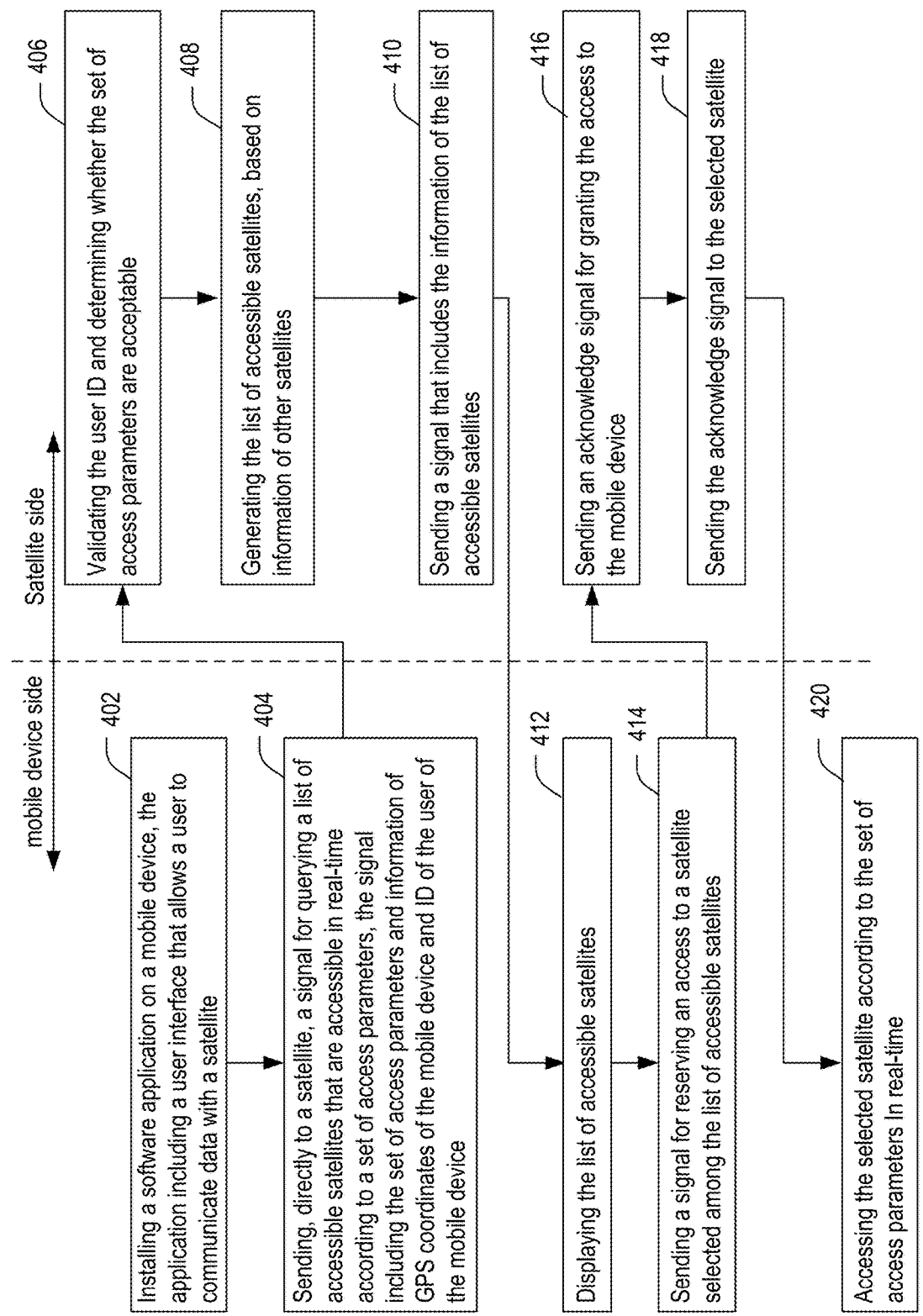
FIG. 4 shows a flowchart of an illustrative process for accessing/controlling a satellite in real-time using a mobile device on the ground according to embodiments of the present disclosure.
Figure 5:
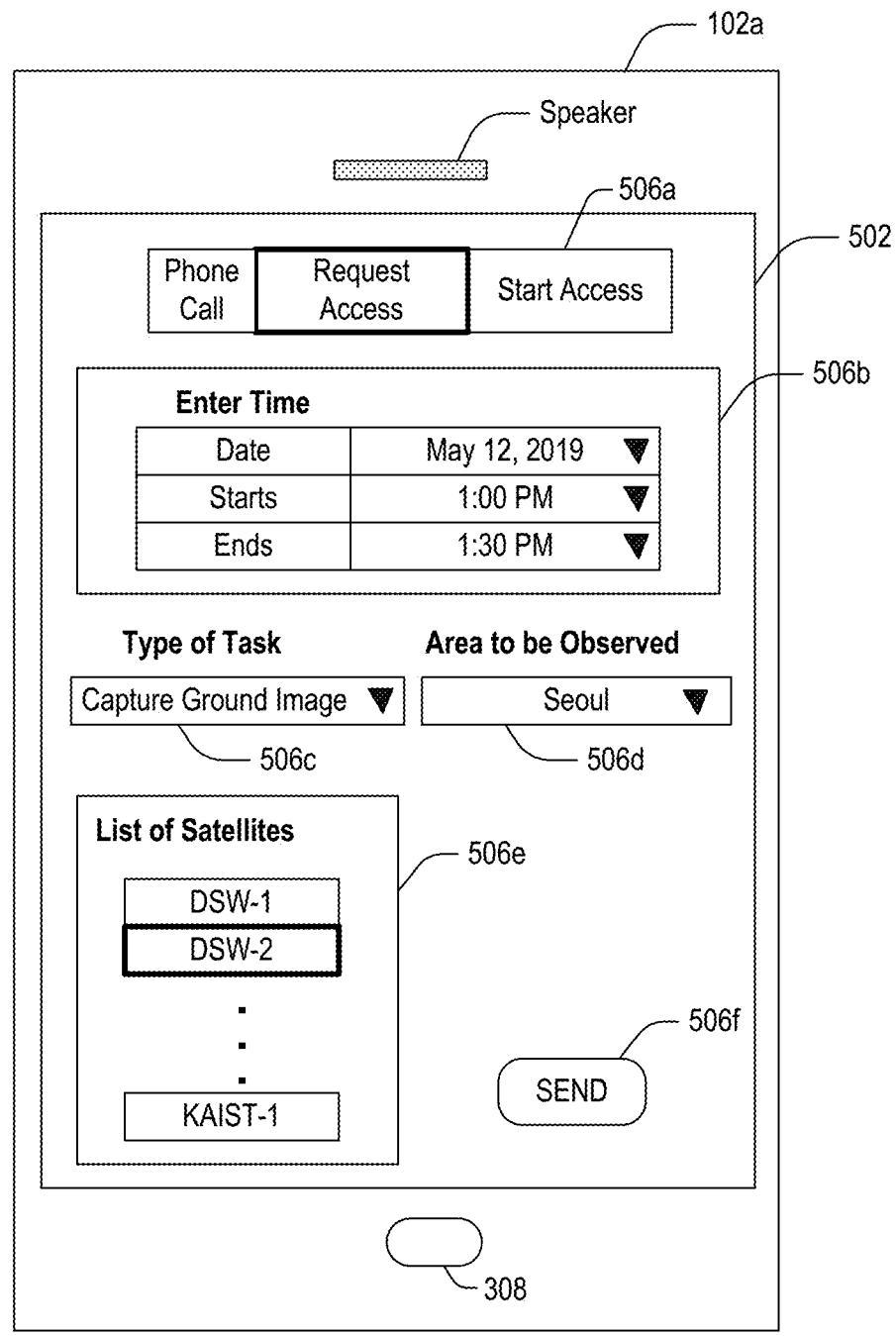
FIG. 5 shows a mobile phone according to embodiments of the present disclosure.

FIG. 4 shows a flowchart of an illustrative process for accessing/controlling a satellite in real-time using a mobile device on the ground according to embodiments of the present disclosure. The process may start at step 402. At step 402, the user of the mobile device (e.g. 102*a*) may install a software application on the mobile device 102*a*, where the application displays a graphic user interface (GUI) that allows a user to communicate data with a satellite (e.g. 104*a*). FIG. 5 shows the mobile phone 102*a* according to embodiments of the present disclosure. As depicted, the mobile phone 102*a* may include: a speaker; a button 308; and a display 502 for displaying the GUI components 506*a*-506*e*.

In embodiments, the user may touch the "Request Access" button in the menu 506*a*. Then, in response to the user's touch of the "Request Access" button, the mobile device 102*a* may display the GUI components 506*b*-506*e* on the display 502. Using the GUI components 506*b*-506*d*, the user may select access parameters, such as the date and time window 506*b* during which he wants to access a satellite, the type of task 506*c* and target location 506*d*. Then, the user may touch the "SEND" button 506*f*.

In response to the user's touch of the button 506*f*, the mobile device 102*a* may send, directly to the satellite 104*a*, a signal for querying a list of accessible satellites that are accessible according to the access parameters at step 404. In embodiments, the signal may include the access parameters and the information of the global positioning system (GPS) coordinates of the mobile device 102*a* and identification (ID) of the user of the mobile device. At step 406, the satellite 104*a* may validate the user ID using the signal from the mobile device 102*a*.

Upon successful validation of the user ID, the satellite 104*a* may determine whether the access parameters are within permitted ranges and acceptable. It may be possible that some of the access parameters may be beyond the limit set by the satellite 104*a*. For instance, certain areas, such as military base, that the government prohibits an access to for security reasons cannot be observed.

Upon determining that the access parameters are with the permitted ranges, the satellite 104*a* may generate a list of satellites that can be accessed by the mobile device 104*a* according to the access parameters at step 408. In embodiments, the satellite 104*a* may use the information of other satellites in the satellite network 104 and in the satellite constellation 144 to generate the list. In embodiments, the information of other satellites at step 408 may include the information that is required to determine whether the satellites meet the access parameters. By way of example, the information may include flight information, such as current locations of the satellites, areas covered by the satellites, flight schedules and trajectories of the satellites, so on. In another example, the information may include specification of the satellites, such as the communication power, numbers and sizes of antennas, so on.

At step 410, the satellite 104*a* may send a signal that includes the information of a list of accessible satellites to the mobile device 102*a*.

At step 412, the mobile device 102a may display the received list of accessible satellites on the GUI component 506e, as shown in FIG. 5. In embodiments, the user may select a satellite (e.g. "DSW-2") by touching one of the satellites in the list on the GUI component 506e, as shown in FIG. 5. Upon selecting a satellite in the list 506e, the user may touch the "SEND" button 506f. Then, at step 414, the mobile device 102a may send a signal for reserving an access to the satellite "DSW-2" that is selected among the list of satellites 506e. In embodiments, the user may select more than one satellite among the list of satellites 506e. In embodiments, the signal for reserving the access may include the access parameters that are selected using the GUI components 506b-506d.

At step 416, the satellite 104a may send an acknowledgement signal for granting the access to the mobile device 102a at step 416. At step 418, the satellite 104a may send the acknowledgement signal to the selected satellite. In embodiments, the acknowledgement signal may be sent to other satellites in the satellite network 104 and satellite constellation 144. In embodiments, the satellite 104a may store the information of the grant to access in its memory.

At step 418, the user of the mobile device 102a may touch the "Start Access" button in the menu 506a to access the selected satellite according to the access parameters 506b-506d. For instance, the mobile device 102a may directly control the satellite 104a during the selected time window to capture images of Seoul. In another example, the mobile device 102a may directly receive data that is provided by the satellite 104a, such as, still image, video clips, etc. and display the data on the display 502.

In embodiments, the satellites 104 may communicate data with the mobile devices 102 based on the block chain technology so that the data is not modified. It is noted that other suitable types of security measures may be used by the satellites 104 to secure the data communicated with the mobile devices 102.

In embodiments, the satellite 104a may assign a higher priority to the mobile device 102a than the mobile device 102b so that the mobile device 102a may access the satellite 104a before the mobile device 140b, even though the mobile device 102a requested the access after the mobile device 102b. For instance, the mobile device 102a may be used to broadcast the natural disaster or national emergency. In embodiments, the satellite 104a may adjust the existing grants to access the satellite 104a according to the priority and notify the adjustment to the corresponding mobile devices.

Figure 6:
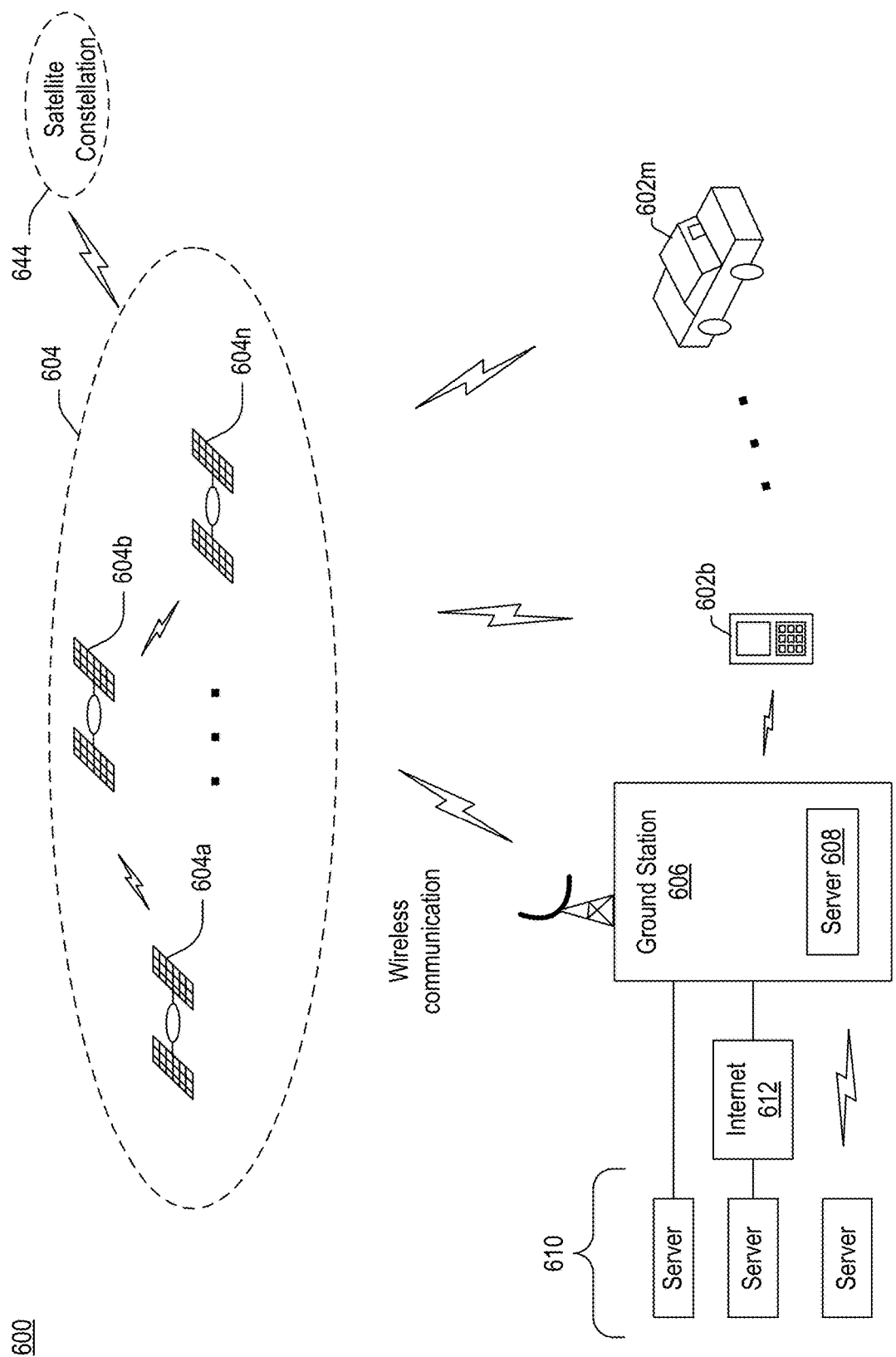
FIG. 6 shows a schematic diagram of a system for direct communication between satellites and mobile devices according to embodiments of the present disclosure.

FIG. 6 shows a schematic diagram of a system 600 for direct communication between satellites and mobile devices according to embodiments of the present disclosure. The system 600 may be similar to the system 100, with the difference that one or more ground stations 606 may communicate with the satellites 604 and satellite constellation 644. It is noted that other suitable number of ground stations may be used in the system 600, even though only one ground station is shown in FIG. 6.

In embodiments, the mobile devices 602a-602m may have the similar functions as the mobile devices 102a-102k to directly communicate with the satellites 604, as described in conjunction with FIGS. 1-5. Similarly, the satellites 604 may have the similar functions as the satellites 104 such that each of the mobile devices 602a-602m may be able to chat and/or exchange messages/images/video clips with other mobile device in real-time and access the satellite during a reserved time window. Similarly, each of the satellite 604 may act as a gateway to the satellite constellation 644 for the mobile devices 602a-602m.

Figure 7:
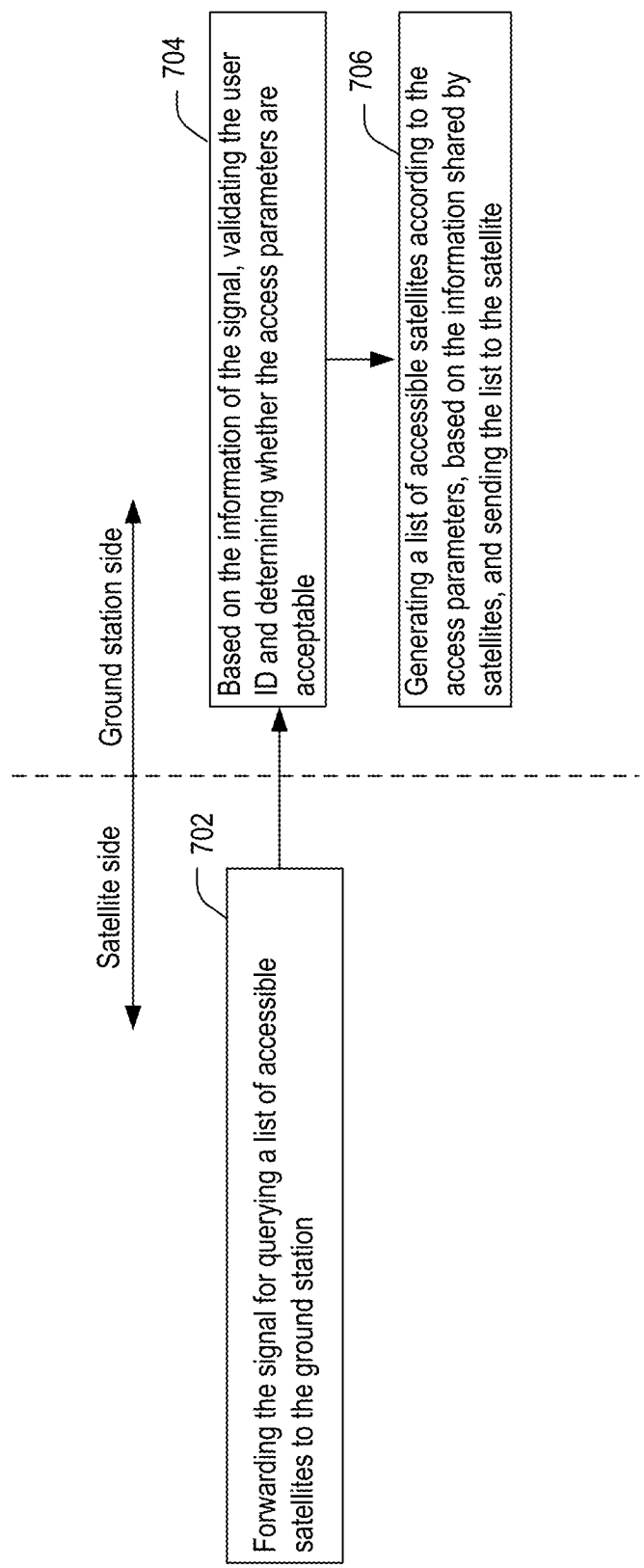
FIG. 7 shows a flowchart of an illustrative process for direct communication between satellites and a ground station according to embodiments of the present disclosure.

In embodiments, the ground station 606 may have a server 608 that shares (and stores) the information with the satellites 604 and is able to perform various tasks on behalf of the satellites 604. FIG. 7 shows a flowchart of an illustrative process for direct communication between satellites 604 and the ground station 606 according to embodiments of the present disclosure. In embodiments, a mobile device (e.g. 602a) may directly communicate data with a satellite (e.g. 604a) in real-time. When the mobile device 602a sends the signal querying an access to a satellite(s) (as described in conjunction with step 404), the satellite may forward the query signal to the ground station 606 at step 702. Then, the ground station 606 may validate the user ID, determine whether the access parameters are acceptable and in permitted ranges, generate the list of accessible satellites, and send the validation result and the list to the satellite 604a at steps 704 and 706, i.e., the ground station 606 may perform the steps 406 and 408 on behalf of the satellite 604a. Then, the satellite 604a may send the information of the list of accessible satellites to the mobile device 602a (as described in conjunction with step 410).

In another example, the satellite 604a may assign a higher priority to the mobile device 602a than the mobile device 602b so that the mobile device 602a may access the satellite 604a before the mobile device 602b, even though the mobile device 602a requested the access after the mobile device 602b. In embodiments, when the mobile device 602a sends a signal for reserving an access to a satellite selected among the list of accessible satellites (as described in conjunction with step 414), the satellite 604a may forward the received signal to the ground station 606, and the ground station may adjust the existing grants to access the satellite 604a according to the priority. Then, the ground station 606 may send the information of the adjusted grants to the satellite 604a so that the satellite 604a may forward the information to the corresponding mobile devices.

In embodiments, the ground station 606 may be communicatively coupled to one or more servers (or computing devices) 610 either wirelessly, by wire or via the Internet 612. In embodiments, one of the severs 610 may be a computing device of an advertisement company and send an advertisement information to the satellites 604 via the ground station 606. Then, the satellites 604 may broadcast the advertisement to the mobile devices 602a-602m. For instance, the advertisement may be a banner displayed on the display of the mobile devices.

In embodiments, the mobile device 602a may not be able to process all of the data received from the satellite 604a at once due to the limited memory size; instead, the data received from the satellite 604a may be saved in the sever 608 of the ground station 606 and the server 608 may break the data into multiple segments and send each segment separately to the mobile device 602a via the satellite 604a in real-time. In alternative embodiments, the satellite 604a may break the data into multiple segments and send each segment directly to the mobile device 602a.

Figure 8:
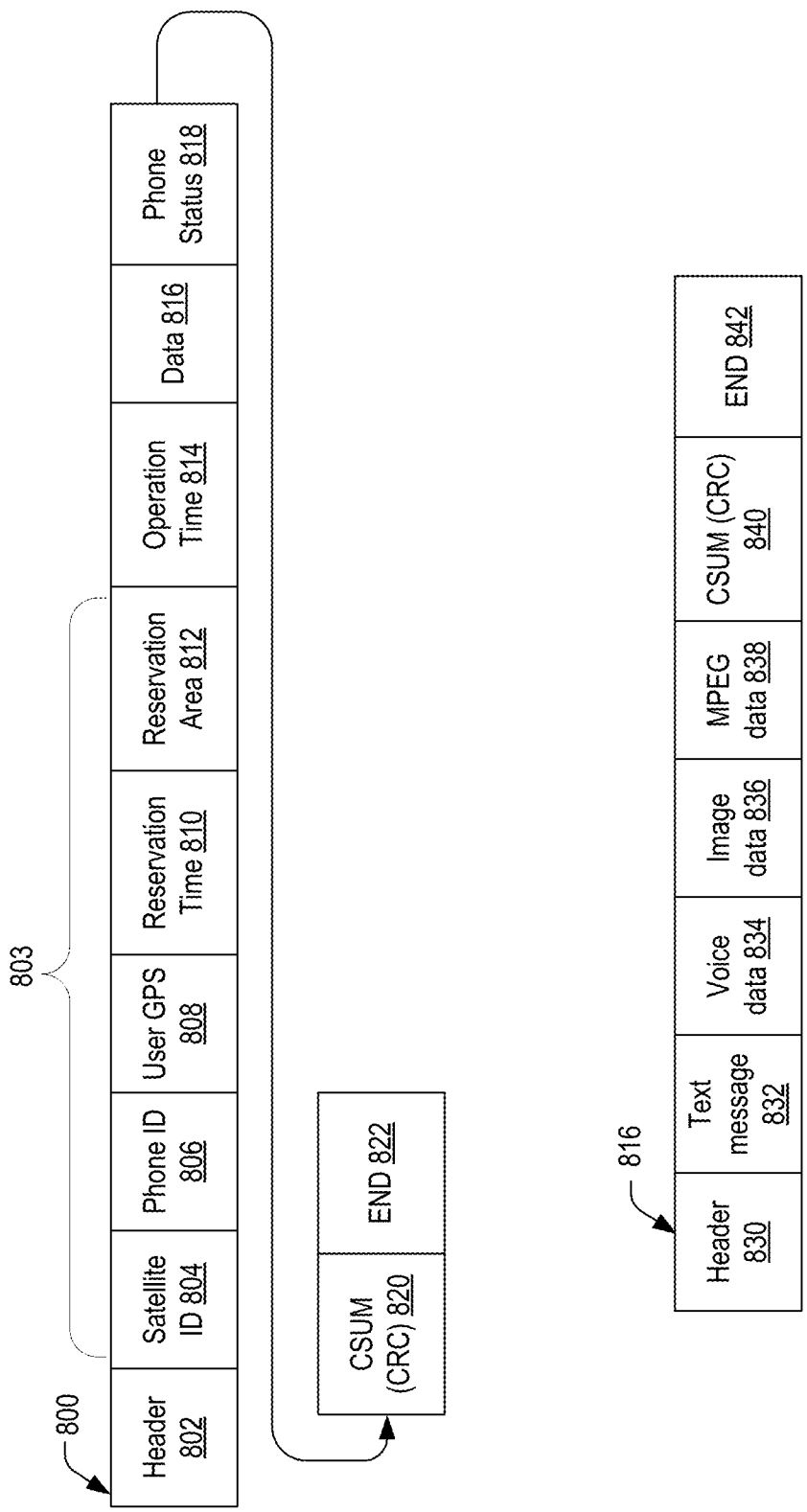
FIG. 8 shows a schematic diagram of an exemplary protocol of data that is transmitted from a mobile device to a satellite according to embodiments of the present disclosure.

In embodiments, the mobile devices 102 and 602 may send data to the satellites 104 and 604 according to various data protocols. FIG. 8 shows a schematic diagram of an exemplary protocol 800 of data that is transmitted from a mobile device to a satellite according to embodiments of the present disclosure. As depicted, the protocol 800 may include: header 802 including the information for parsing the following portion of the data; satellite ID 804 including an identification information of the receiving satellite; phone ID 806 including an identification information of the data sending mobile device 102a; user GPS 808 including a coordinate information of the mobile device 102a; reservation time 810 including the information of the access time in the GUI component 506b; reservation area 812 including the information of target area in the GUI component 506d; operation time 814 including the information of the operation time; data 816; phone status 818 including the status of the mobile device (e.g. 102b) that the user of the mobile device 102a wants to communicate with; CSUM 820 including information for checksum, such as cyclic redundancy check (CRC); and end portion 822 including end portion of the data. In embodiments, telemetry data may refer to the information in the data fields 804, 806, 808, 810 and 812.

In embodiments, the protocol 800 may include the information, such as reservation (or access) time 810 and area 812, that the user of the mobile device (e.g. 102a) enters into the GUI components 306b-306d and 506b-506e and the information, such as phone ID 806 and user GPS 808, that the mobile device 104a adds when the data is sent to the satellite (e.g. 104a). It should be apparent to those of ordinary skill in the art that other types of protocol may be used to send the data 816 in place of the protocol 800. It should be also apparent to those of ordinary skill in the art that some of the data fields in the protocol 800 may not carry any information and that addition data fields may be added to the protocol 800. For instance, the phones status 818 may not include any information since the mobile device 102a may not know about the status of the mobile phone 102b at the time when the mobile device 102a sends a request for communication with the mobile device 102b via the satellite 104a.

In embodiments, the data 816 may include various contents, depending on the type of the communication between the mobile device 102a and satellite 104a. In embodiments, the mobile device 102a may communicate data with another mobile device 102b vi the satellite 104a, as discussed in conjunction with FIGS. 2 and 3. In such a case, the data 816 may include: header 830 including the information for parsing the following portion of the data; text message 832 including text message entered into the GUI component 306c by the user of the mobile device 102a; voice message 834 including voice message of the user of the mobile device 102a; image data 836 uploaded by the user of the mobile device 102a using the GUI component 306d; MPEG data 838 uploaded by the user of the mobile device 102a; CSUM (CRC) 840 including information for checksum; and end 842 including end portion of the data 816.

In embodiments, the mobile device 102a may use the protocol 800 to send data to the satellite 104a at various steps in FIG. 4. In such a case, some of the information fields of the data 816 may not carry any information therein.

In embodiments, the mobile device 102a may want to broadcast an advertisement. In such a case, the data 816 may include an advertisement, such as banner, where the satellite 104a may download the advertisement contents to other mobile devices.

Figure 9:
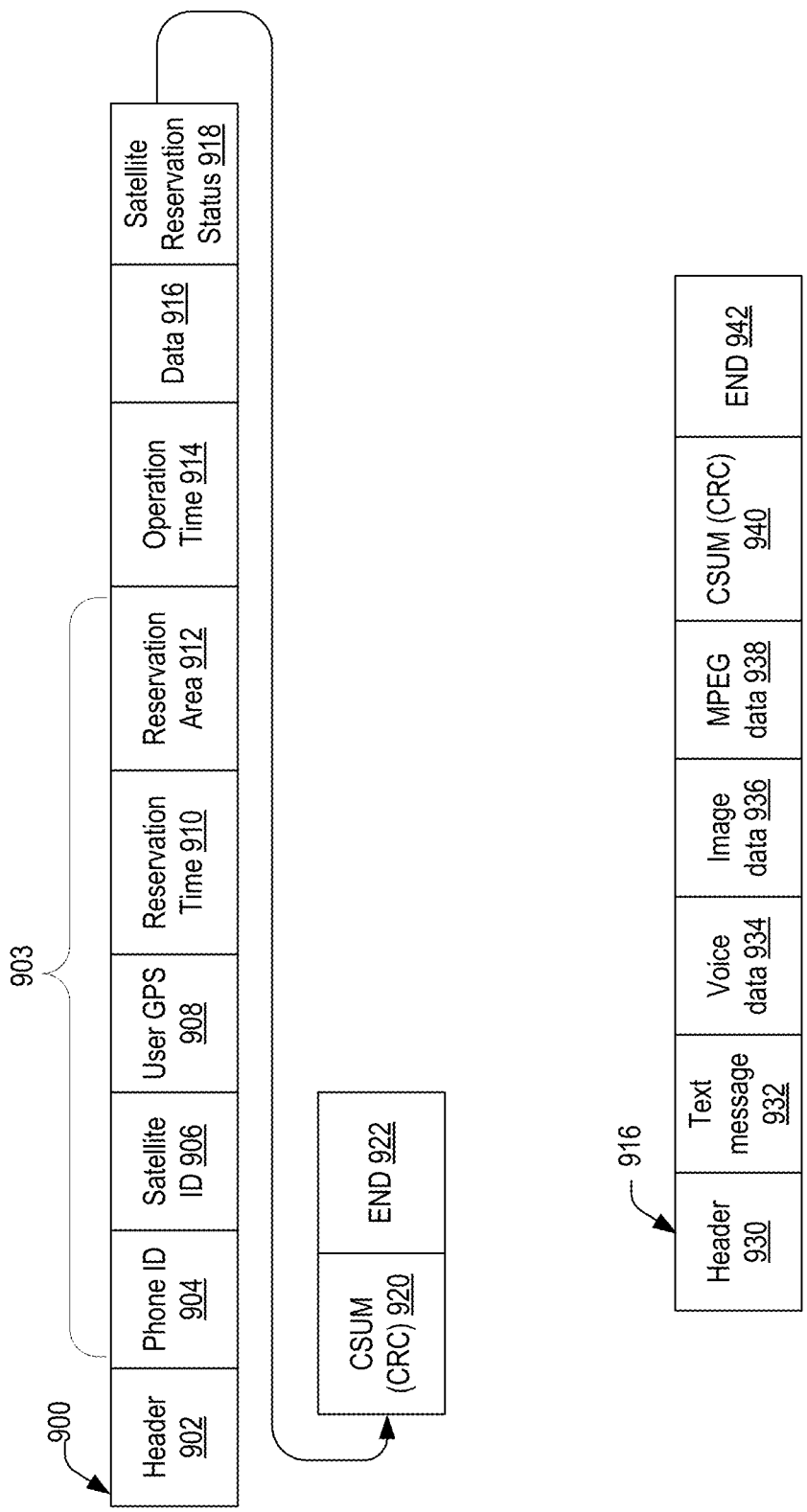
FIG. 9 shows a schematic diagram of an exemplary protocol of data that is transmitted from a satellite to a mobile device according to embodiments of the present disclosure.

In embodiments, the satellites 104 and 604 may send data to the mobile devices 102 and 602 according to various data protocols. FIG. 9 shows a schematic diagram of an exemplary protocol 900 of data that is transmitted from a satellite to a mobile device according to embodiments of the present disclosure. As depicted, the protocol 900 may include: header 902 including the information for parsing the following portion of the data; phone ID 904 including an identification information of the receiving mobile device 102a; satellite ID 906 including an identification information of the data sending satellite 104a; user GPS 908 including a coordinate information of the mobile device 102a; reservation time 910 including the information of the access time; reservation area 912 including the information of target area of interest; operation time 914 including the information of the operation time; data 916; satellite reservation status 918 information on whether the satellite 104a is accessible during the reservation time in the reservation area; CSUM 920 including information for checksum, such as cyclic redundancy check (CRC); and end portion 922 including end portion of the data. In embodiments, telemetry data may refer to the information in the data fields 904, 906, 908, 910 and 912.

In embodiments, the data 916 may include various contents, depending on the type of the communication between the mobile device 102a and satellite 104a. In embodiments, the mobile device 102a may communicate data with another mobile device 102b vi the satellite 104a, as discussed in conjunction with FIGS. 2 and 3. In such a case, the data 916 sent to the mobile device 102a may include: header 930 including the information for parsing the following portion of the data; text message 932 including text message uploaded by the user of the mobile device 102b; voice message 934 including voice message of the user of the mobile device 102b; image data 936 uploaded by the user of the mobile device 102b; MPEG data 938 uploaded by the user of the mobile device 102b; CSUM (CRC) 940 including information for checksum; and end 942 including end portion of the data 916.

In embodiments, the satellite 104a may use the protocol 900 to send data to the mobile device 102a at various steps in FIG. 4. In such a case, some of the information fields of the data 916 may not carry any information therein.

Figure 10:
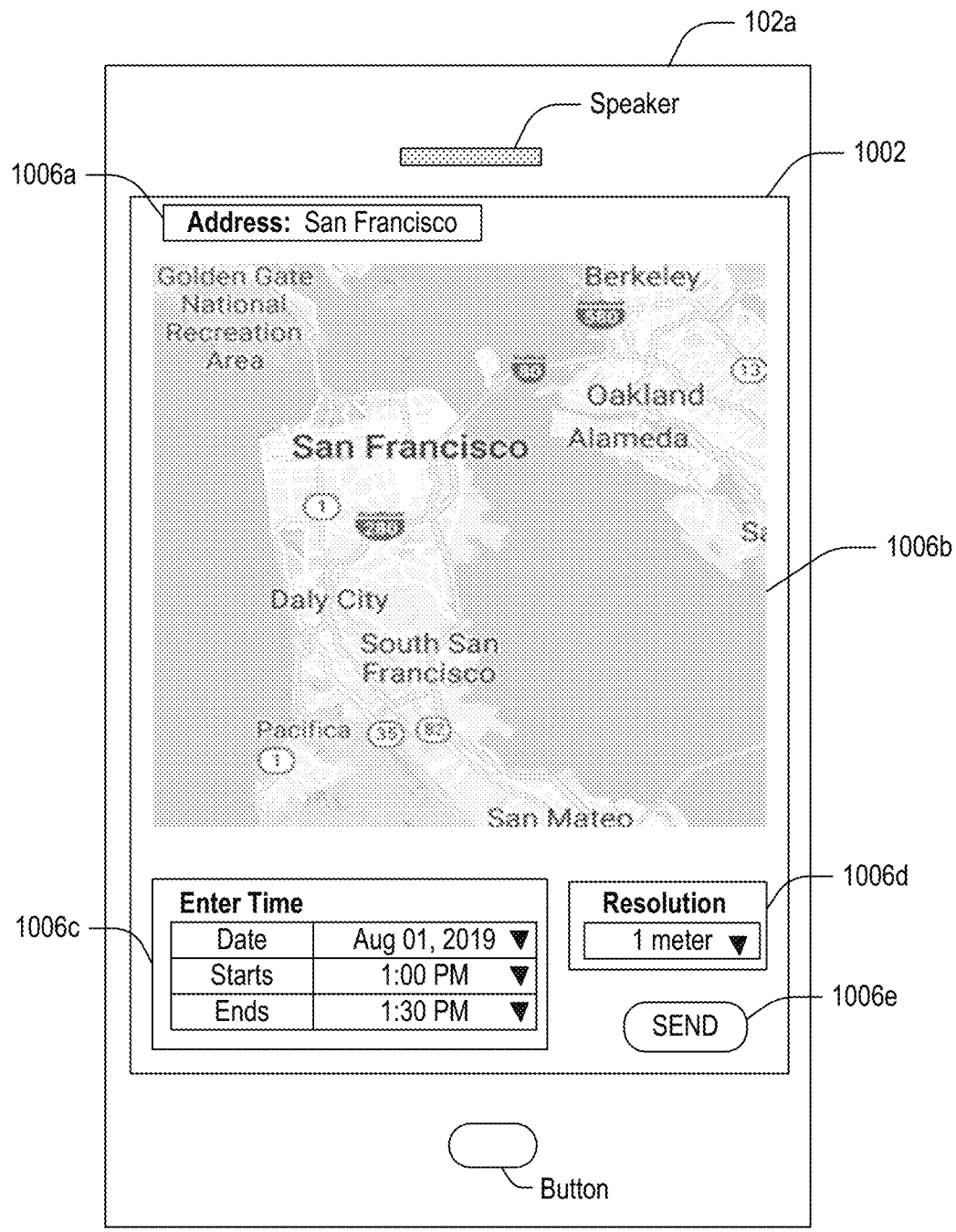
FIG. 10 shows a mobile phone according to embodiments of the present disclosure.
Figure 11:
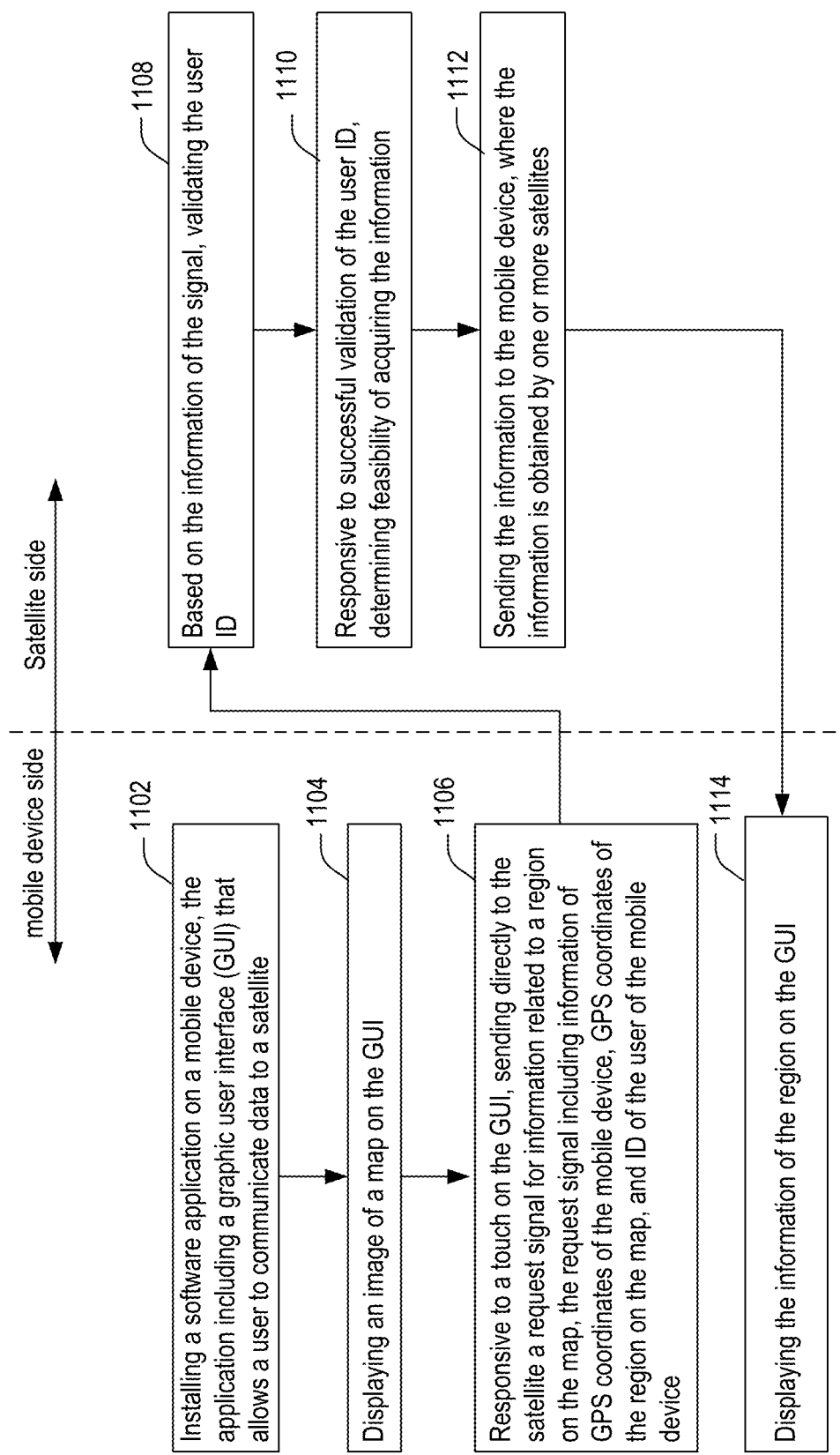
FIG. 11 shows a flowchart of an illustrative process for acquiring satellite images of a region using a mobile device on the ground according to embodiments of the present disclosure.

FIG. 10 shows the mobile phone (e.g. 102a) according to embodiments of the present disclosure. As depicted, the mobile phone 102a may include: a speaker; a button; and a display 1002 for displaying the GUI components 1006a-1006e. (Hereinafter, the term GUI may collectively refer to the GUI components 1006a-1006e.) It is noted that the display 1002 may have other suitable design and arrangements of GUI components. FIG. 11 shows a flowchart of an illustrative process for acquiring satellite images of a region using a mobile device 102a on the ground according to embodiments of the present disclosure.

In FIG. 11, the process may start at step 1102. At step 1102, the user of the mobile device (e.g. 102a) may install a software application on the mobile device 102a, where the application displays the GUI in FIG. 10 that allows a user to communicate data to a satellite (e.g. 104a). In embodiments, the user may want to get satellite images of a region in real-time, for instance. Hereinafter, for the purpose of illustration, it is assumed that the user wants to get the satellite images of a region on the ground, even though the user may want to get other types of information. In embodiments, the display 1002 may be a touch screen that allows the user to interact with the mobile device 102a.

At step 1104, an image of a map may be displayed on the GUI component 1006b. In embodiments, the user may enter the address of a location in the text field 1006a, where the map displayed in the GUI component 1006b may be centered around the address. In embodiments, the user may touch the screen to change the location of the region on the map. In embodiments, the user may use two fingers to control the zoom level of the image of the map so that the user can set the boundary of the region of his interest.

In embodiments, the user may want to watch the real-time satellite images of the region on the map displayed on the GUI component 1006b. Upon selection of the region, the user may touch the GUI component 1006e, i.e., "SEND" button.

At step 1106, the mobile device 102a may send directly to the satellite 104a a request signal for acquiring information related to the region on the map, where the request signal includes information of GPS coordinates of the mobile device, GPS coordinates of the region on the map, and ID of the user of the mobile device. In embodiments, the GPS coordinates of the region on the map may include the GPS coordinates of the four corners of the region. In embodiments, the request may use the protocol 800 in FIG. 8.

In embodiments, the user may set the values of parameters for the information related to the region on the map, such as the date and time window 1006c during which satellite images of the region on the map are to be acquired by one or more satellites. In embodiments, the user may set the ground resolution of satellite image using the GUI component 1006d. Hereinafter, the term "ground resolution" means the minimum distance on the ground between two closely located objects distinguishable as separate objects.

Then, the user may touch the "SEND" button 1006e. In such a case, the request signal sent to the satellite 104a may also include information of the values of the parameters for the information and/or the ground resolution of satellite image.

At step 1108, the satellite 104a may validate the user ID in the request signal. At step 1110, responsive to a successful validation of the user ID, the satellite 104a may determine the feasibility of acquiring the requested information. In embodiments, when the user requested real-time satellite images of the region on the map, the satellite 104a may determine whether there is any satellite that can capture the images of the region. In embodiments, when the user set the time window using the GUI component 1006c, the satellite 104a may determine whether there is any satellite(s) that can capture the images of the region during the time window.

At step 1112, one or more of the satellites 104 may send the information related to the region on the map to the mobile device 102a, where the information is obtained by one or more of the satellites 104. For instance, the satellite 102a may receive satellite images from another satellite (e.g. 104b) that can capture the image of the region on the map and start forwarding satellite images to the mobile device 102 in real-time. As the time progresses, the satellite 104b may change its location on its orbit and cannot cover the region on the map any more. In such a case, another satellite (e.g. 104c) may take over to resume sending the satellite images to the satellite 104a so that the satellite 104a can forward satellite images to the mobile device 102a. In another example, the satellite 104a may send satellite images to the mobile device 102a. As the time progresses, the satellite 104a may change its location on its orbit and cannot directly communicate with the mobile device 102a anymore. In such a case, another satellite (e.g. 104b) may take over to resume sending the satellite images to the satellite 104a. In yet another example, the satellite 102a may communicate with other satellite(s), receive satellite images of the region from the other satellite(s) during the time window defined in the GUI component 1006c, and forward the received images to the mobile device 102a. As discussed in these examples, one or more satellites may collect the information related to the region on the map, and one or more satellites may send the information to the mobile device 102a. At step 1114, the information received from the satellite(s) may be displayed on the display 1002.

In embodiments, the mobile device may use the protocol 800 to send data to the satellite and the satellite may use the protocol 900 to send data to the mobile device at various steps in FIG. 11.

Figure 12:
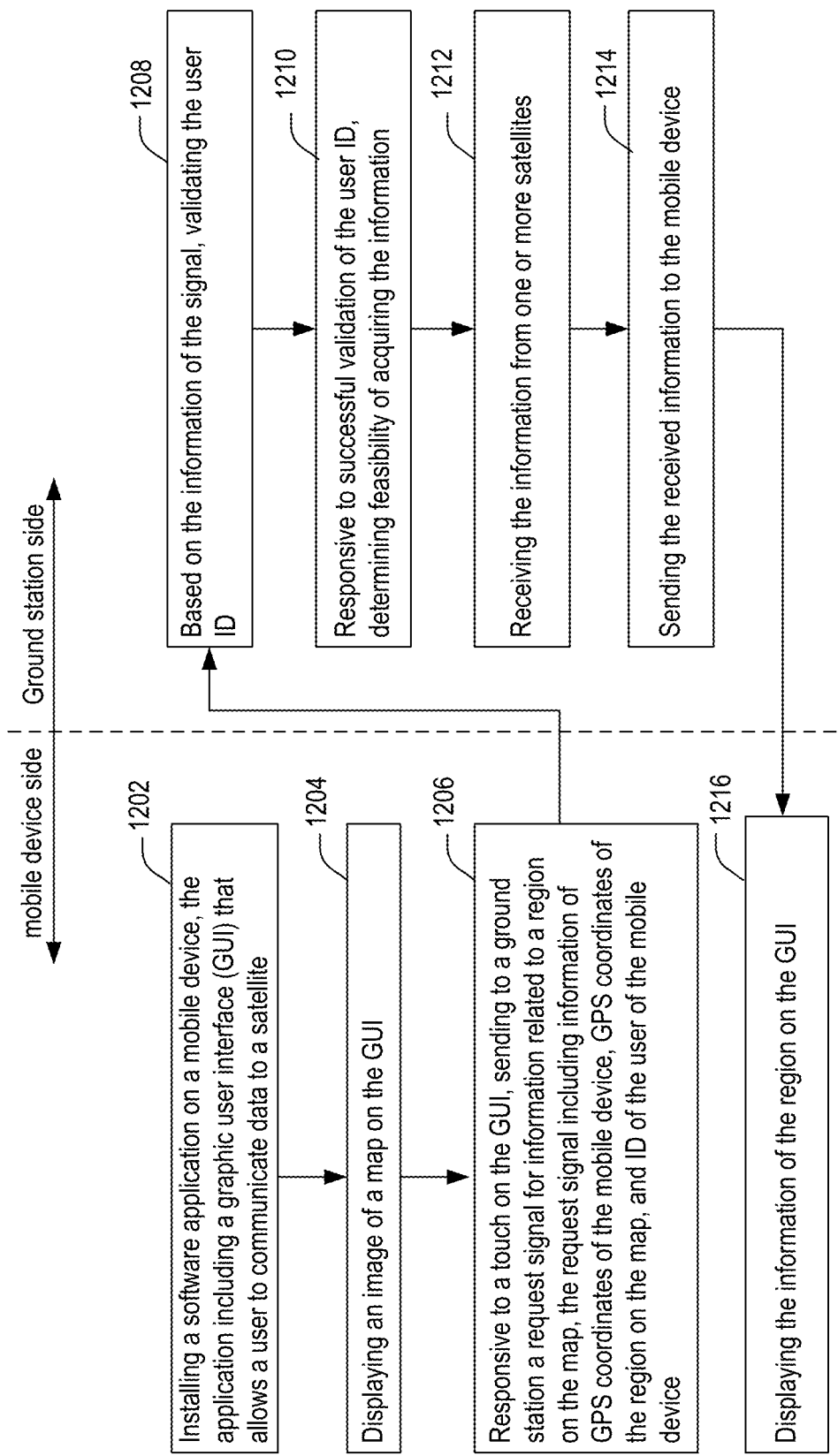
FIG. 12 shows a flowchart of an illustrative process for acquiring satellite images of a region using a mobile device on the ground according to embodiments of the present disclosure.

In embodiments, the mobile device 102a may communicate with the satellite 104a via a ground station (e.g. 606) so that the mobile device 102a may get the real-time satellite images of a region on the map 1006e or satellite images acquired during the time interval specified in the GUI component 1006c. Stated differently, the mobile device 102a may operate in the system 600 to communicate with satellites 604 via the ground station 606. FIG. 12 shows a flowchart of an illustrative process for acquiring satellite images of a region using a mobile device 102a via the ground station 604 according to embodiments of the present disclosure.

In FIG. 12, the process may start at step 1202. At step 1202, the user of the mobile device (e.g. 102a) may install a software application on the mobile device 102a, where the application displays the GUI in FIG. 10 that allows a user to communicate data to a satellite (e.g. 604a). In embodiments, the user may want to get satellite images of a region in real-time, for instance. Hereinafter, for the purpose of illustration, it is assumed that the user wants to get the satellite images of a region on the ground, even though the user may want to get other types of information. In embodiments, the display 1002 may be a touch screen that allows the user to interact with the mobile device 102a.

At step 1204, an image of a map may be displayed on the GUI component 1006b. In embodiments, the user may enter the address of a location in the text field 1006a, where the map displayed in the GUI component 1006b may be centered around the address. In embodiments, the user may touch the screen to change the location of the region on the map. In embodiments, the user may use two fingers to control the zoom level of the image of the map so that the user can set the boundary of the region of his interest.

In embodiments, the user may want to watch the real-time satellite images of the region on the map displayed on the GUI component 1006b, i.e., the information related to the region on the map may be real-time satellite images. Upon selection of the region, the user may touch the GUI component 1006e, i.e., "SEND" button.

At step 1206, the mobile device 102a may send to the ground station 606 a request signal for acquiring information related to the region on the map, where the request signal includes information of GPS coordinates of the mobile device, GPS coordinates of the region on the map, and ID of the user of the mobile device. In embodiments, the GPS coordinates of the region on the map may include the GPS coordinates of the four corners of the region. In embodiments, the request may use the protocol 800 in FIG. 8.

In embodiments, the user may set the values of parameters for the information related to the region on the map, such as the date and time window 1006c during which satellite images of the region on the map are to be acquired by one or more satellites. In embodiments, the user may set the ground resolution of satellite image using the GUI component 1006d.

Then, the user may touch the "SEND" button 1006e. In such a case, the request signal sent to the ground station 606 may also include information of the values of the time window specified in the GUI component 1006c and/or the ground resolution of satellite image specified in the GUI component 1006d.

At step 1208, the ground station 606 may validate the user ID in the request signal. At step 1210, responsive to a successful validation of the user ID, the satellite 104a may determine the feasibility of acquiring the requested information. In embodiments, when the user requested real-time satellite images of the region on the map, the ground station 606 may determine whether there is any satellite that can capture the images of the region. In embodiments, when the user sets the time window using the GUI component 1006c, the ground station 606 may determine whether there is any satellite(s) that can capture the images of the region during the time window. In embodiments, when the user sets the ground resolution, the ground station 606 may determine whether there is any satellite(s) that can capture the images of the region at the specified ground resolution.

At step 1212, the ground station 606 may receive the information related to the region on the map from one or more of the satellites 604. At step 1214, the ground station 606 may send the received information to the mobile device 102a. At step 1216, the information received from the ground station 606 may be displayed on the display 1002.

In embodiments, the mobile device may use the protocol 800 to send data to the satellite and the satellite may use the protocol 900 to send data to the mobile device at various steps in FIG. 12.

Figure 13:
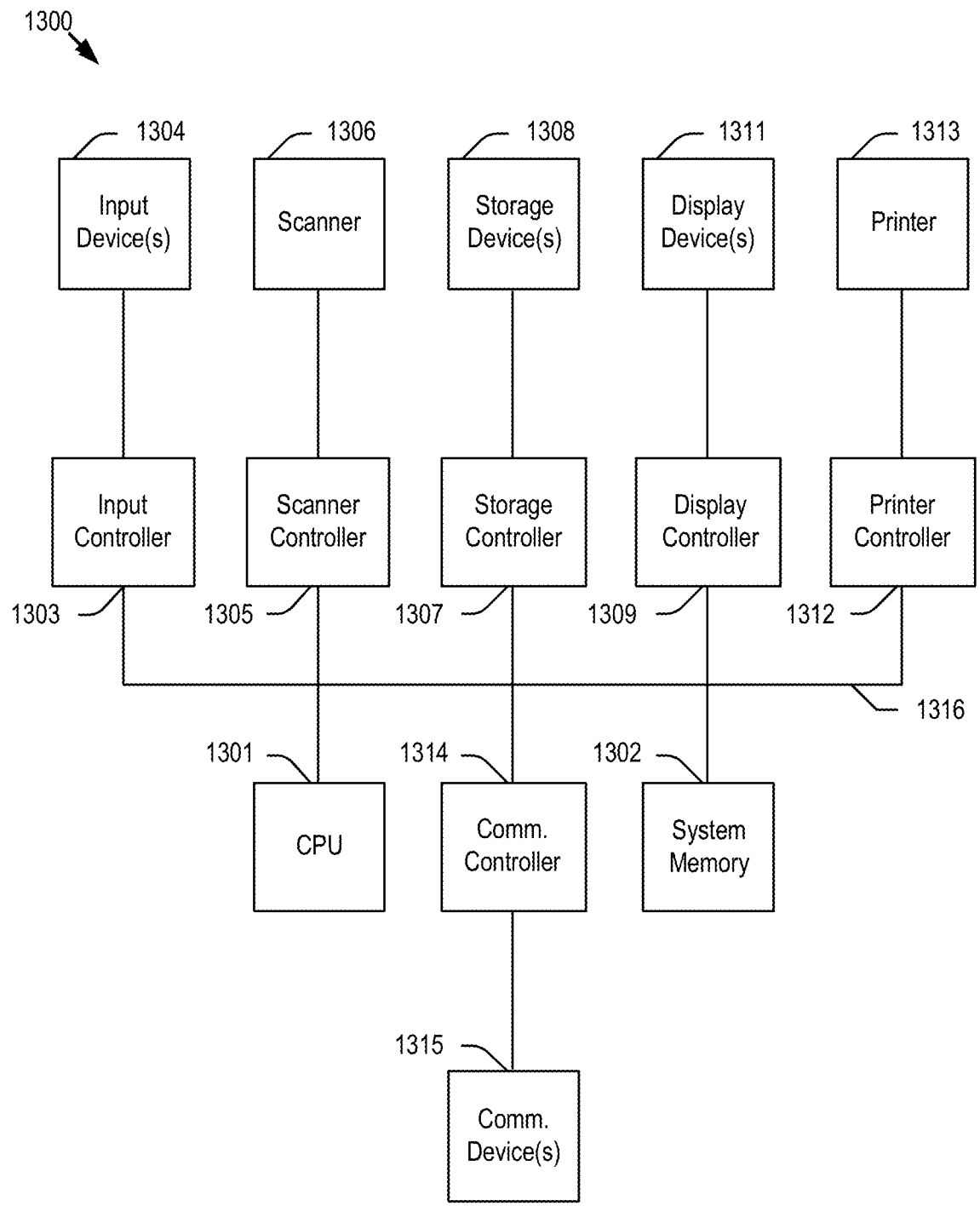
FIG. 13 shows a schematic diagram of a system for implementing one or more aspects of the present disclosure.

FIG. 13 shows a schematic diagram of a system 1300 for implementing one or more aspects of the present disclosure. It will be understood that the functionalities shown for system 1300 may operate to support various embodiments of the electronic devices (such as mobile devices, servers and satellites) shown in FIGS. 1-12—although it shall be understood that an electronic device may be differently configured and include different components. As illustrated in FIG. 13, system 1300 includes a central processing unit (CPU) 1301 that provides computing resources and controls the computer. CPU 1301 may be implemented with a microprocessor or the like, and may also include a graphics processor and/or a floating point coprocessor for mathematical computations. System 1300 may also include a system memory 1302, which may be in the form of random-access memory (RAM) and read-only memory (ROM).

A number of controllers and peripheral devices may also be provided, as shown in FIG. 13. An input controller 1303 represents an interface to various input device(s) 1304, such as a keyboard, mouse, or stylus. There may also be a scanner controller 1305, which communicates with a scanner 1306. System 1300 may also include a storage controller 1307 for interfacing with one or more storage devices 1308 each of which includes a storage medium such as magnetic tape or disk, or an optical medium that might be used to record programs of instructions for operating systems, utilities and applications which may include embodiments of programs that implement various aspects of the present invention. Storage device(s) 1308 may also be used to store processed data or data to be processed in accordance with the invention. System 1300 may also include a display controller 1309 for providing an interface to a display device 1311, which may be a cathode ray tube (CRT), a thin film transistor (TFT) display, or other type of display. System 1300 may also include a printer controller 1312 for communicating with a printer 1313. A communications controller 1314 may interface with one or more communication devices 1315, which enables system 1300 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

What is claimed is:

1. A mobile device for directly communicating with one or more satellites, comprising:
    a communication device for directly communicating data with a satellite;
    a display for displaying a graphic user interface (GUI) that shows an image of a map;
    one or more processors; and
    a non-transitory computer-readable medium comprising one or more sequences of instructions which, when executed by the one or more processors, causes steps to be performed comprising:
        displaying a first GUI component that allows a user of the mobile device to set a time window during which information related to a region on the map is to be acquired by one or more satellites;
        displaying a second GUI component that allows the user to set a ground resolution of a satellite image,
        responsive to a touch on the GUI, sending a request signal for information related to a region on the map directly to the satellite via the communication device, wherein the request signal includes information of global positioning system (GPS) coordinates of the mobile device, GPS coordinates of the region on the map, and an identification (ID) of the user and wherein the request further includes information of at least one of the time window and the ground resolution;
        receiving the information related to the region on the map directly from a satellite; and
        displaying the information on the display.

2. A mobile device as recited in claim 1, wherein the information related to the region on the map includes a real-time satellite image of the region on the map.

3. A satellite for directly communicating with one or more mobile devices on a ground, comprising:
    a communication device for directly communicating data with a mobile device that is configured to display an image of a map;
    one or more processors; and
    a non-transitory computer-readable medium comprising one or more sequences of instructions which, when executed by the one or more processors, causes steps to be performed comprising:
        receiving a request signal for information related to a region on the map directly from the mobile device via the communication device;
        acquiring the information related to the region on the map; and
        sending the information to the mobile device,
    wherein the request signal includes information of at least one of a time window during which the information related to the region on the map is to be acquired by one or more satellites and a ground resolution of a satellite image.

4. A satellite as recited in claim 3, wherein the request signal further includes information of global positioning system (GPS) coordinates of the mobile device, GPS coordinates of the region on the map, and an identification (ID) of a user of the mobile device.

5. A satellite as recited in claim 3, wherein the information related to the region on the map includes a real-time satellite image of the region on the map.

6. A satellite as recited in claim 3, wherein the steps further comprise, prior to the step of acquiring the information:
    validating an identification (ID) of a user of the mobile device.

7. A satellite as recited in claim 6, wherein the steps further comprises:
    responsive to a successful validation of the ID, determining feasibility of acquiring the information.

8. A method for communicating data with one or more satellites, comprising:
    displaying an image of a map on a graphic user interface (GUI) on a mobile device;
    displaying a first GUI component that allows a user of the mobile device to set a time window during which information related to a region on the map is to be acquired by one or more satellites;
    displaying a second GUI component that allows the user to set a ground resolution of a satellite image,
    responsive to a touch on the GUI, sending a request signal for the information related to a region on the map directly to a satellite; and
    receiving the information from a satellite,
    wherein the request signal includes information of at least one of the time window and the ground resolution of a satellite image.

9. A method as recited in claim 8, wherein the wherein the request signal further includes information of global positioning system (GPS) coordinates of the mobile device, GPS coordinates of the region on the map, and an identification (ID) of the user.

10. A method as recited in claim 8, wherein the information related to the region on the map includes a real-time satellite image of the region on the map.

11. A method device as recited in claim 8, further comprising:
    receiving the information related to the region on the map directly from a satellite; and
    displaying the information on the GUI.

12. A method for directly communicating with one or more mobile devices on a ground, comprising:
    receiving a request signal for information directly from a mobile device via a communication device, the mobile device being configured to display an image of a map, the information being related to a region on the map;
    acquiring the information related to the region on the map; and
    sending the information to the mobile device,
    wherein the request signal includes information of at least one of a time window during which the information related to the region on the map is to be acquired by one or more satellites and a ground resolution of a satellite image acquire by a satellite.

13. A method as recited in claim 12, wherein the request signal further includes information of global positioning system (GPS) coordinates of the mobile device, GPS coordinates of the region on the map, and an identification (ID) of a user of the mobile device.

14. A method as recited in claim 12, wherein the information related to the region on the map includes a real-time satellite image of the region on the map.

15. A method as recited in claim 12, further comprising, prior to the step of acquiring the information:
 validating an identification (ID) of a user of the mobile device; and
 responsive to a successful validation of the ID, determining feasibility of acquiring the information.

* * * * *